United States Patent [19]

Maeda et al.

[11] Patent Number: 5,633,624
[45] Date of Patent: May 27, 1997

[54] VEHICLE ANTI-THEFT SYSTEM

[75] Inventors: Susumu Maeda; Eiji Mutoh; Shinichi Kubota, all of Wako, Japan

[73] Assignee: Honda Giken Kogyo Kabushiki Kaisha, Tokyo, Japan

[21] Appl. No.: 462,907

[22] Filed: Jun. 5, 1995

[30] Foreign Application Priority Data

Sep. 22, 1994 [JP] Japan .................................. 6-252701
Nov. 9, 1994 [JP] Japan .................................. 6-299027

[51] Int. Cl.$^6$ .................................................. B60R 25/10
[52] U.S. Cl. ........................ 340/426; 307/10.2; 307/10.5
[58] Field of Search .................. 364/424.03, 424.05, 364/425.01; 340/426, 425.5, 425.31; 307/10.2, 10.3, 10.5; 180/287

[56] References Cited

U.S. PATENT DOCUMENTS

| | | | |
|---|---|---|---|
| 4,291,237 | 9/1981 | Kitano | 307/10.3 |
| 4,366,466 | 12/1982 | Lutz | 307/10.5 |
| 4,965,460 | 10/1990 | Tanaka et al. | 307/10.2 |
| 5,161,106 | 11/1992 | Shiraishi et al. | 364/424.03 |
| 5,323,140 | 6/1994 | Boyles | 340/425.5 |
| 5,467,272 | 11/1995 | Yoshida et al. | 364/424.03 |

FOREIGN PATENT DOCUMENTS

| | | |
|---|---|---|
| 0372741 | 6/1990 | European Pat. Off. . |
| 2046827 | 11/1980 | United Kingdom . |

*Primary Examiner*—Thomas Mullen
*Assistant Examiner*—Mohammed R. Ghannam
*Attorney, Agent, or Firm*—Pollock, Vande Sande & Priddy

[57] ABSTRACT

Ribs 9'a to 9'd provided in a connector 50b on the terminal device side are coincident with grooves 8'a to 8'd provided in a connector 40b on the ECU 30b side, but are not coincident with grooves 8a to 8d provided in a connector 40a in position, size and shape. Even if the connector 40b of the ECU 30b without the immobilizer CPU 13 is attempted to be engaged the connector 50a which should originally be connected to the ECU 30a with the immobilizer CPU 13, it cannot be engaged or right electrical connections between input/output terminals in the ECU 30a and corresponding terminal devices cannot be achieved. Accordingly, the theft of the vehicle by replacing the ECU 30a with the ECU 30b is prevented.

10 Claims, 10 Drawing Sheets

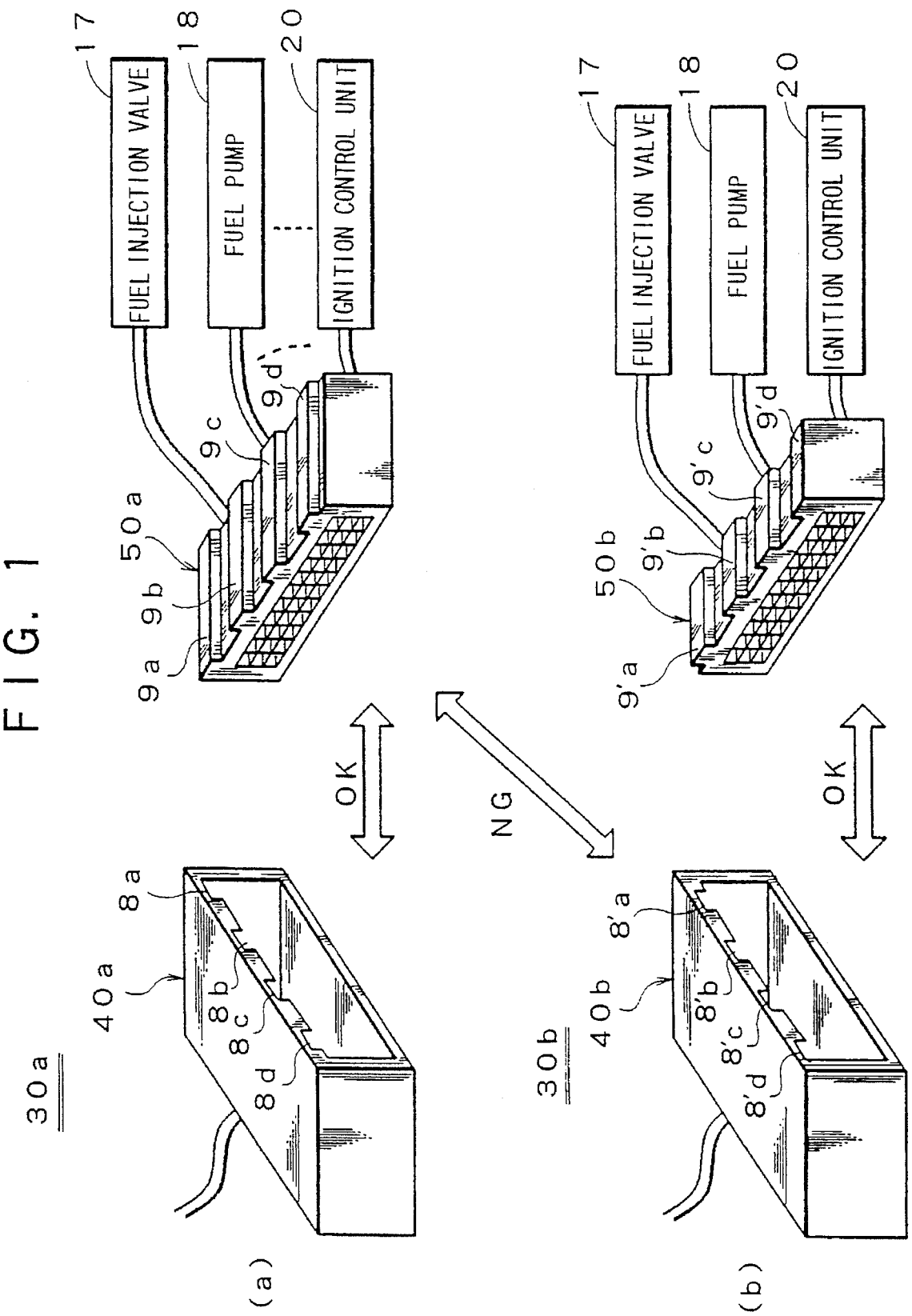

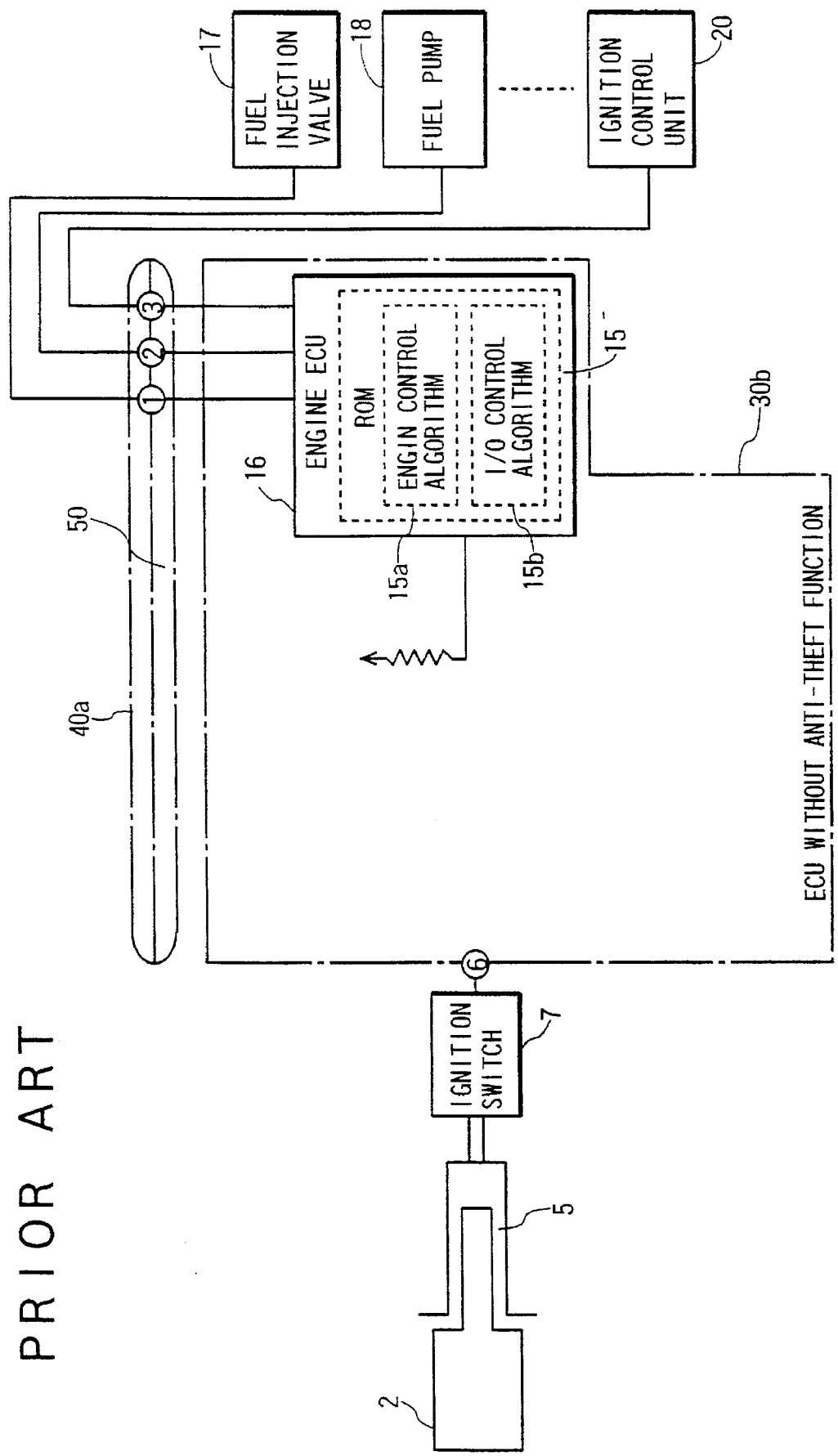

VEHICLE ANTI-THEFT SYSTEM

BACKGROUND OF THE INVENTION

1. Field of the Invention

The present invention is related to a vehicle anti-theft system, and particularly to a vehicle anti-theft system in which the start-up of the engine is enabled on condition that a predetermined relationship is satisfied by an ID code previously registered in the engine key or the like and another ID code previously registered in the vehicle.

2. Description of the Prior Art

In various proposals for preventing the theft of a vehicle such as a car, the vehicle is prevented from being started or it is immobilized by mechanical and/or electrical means when it is attempted to be started or moved using a wrong key. This is achieved by previously storing an identification code or a key ID code in a key, reading the key ID code when the key is inserted into a key cylinder to start the vehicle, comparing it with a reference ID code prestored in the vehicle, generating an enable signal only when there is a match between both ID codes, and enabling the engine to be started up only when an engine control unit successfully receives the enable signal. In this case, since a theft may be committed by mechanical breakage or illegal wiring if the enable signal is a binary signal of on/off, the encoding of the enable signal has been proposed, for instance, in the "Car Technology", Vol. 48, No. 8, 1994, pp. 59–64.

An example of a conventional transponder type immobilizer is shown in FIG. 8. A key 2 includes a memory (not shown) in which a key ID code (for instance, of 64 bits) is prestored, and a transmitter 4 for transmitting the key ID code. The transmitter 4 of the key 2 and a key cylinder 5 are coupled together by, for instance, an induction coil (antenna) 6.

When the key 2 is inserted into the key cylinder and rotated to the ignition ON position, an ignition switch 7 is closed. In response to this, an immobilizer CPU 13 operates, and operating electric power is supplied from a power amplifier of an antenna unit 29 to the transmitter 4 through the coil (antenna) 6. The transmitter 4 responds to this to read the key ID code, and transmits it to the key cylinder 5.

The received key ID code is amplified in the antenna unit 29, digitized by an I/F circuit 12 in the immobilizer 10, and read into the CPU 13 and temporarily stored in an appropriate ID code register 13B in the CPU 13. In an EEPROM 13A of the CPU 13, a unique reference ID code assigned to each vehicle is prestored, and the reference ID code and the key ID code which was read in are compared with each other by a compare unit 13S of the CPU 13. If it is determined that there is a match between the two codes or they are in a predetermined relationship, an enable signal is transmitted from the compare unit 13S to an engine control unit (engine ECU) 16. At the same time, a starter relay is activated to initiate the rotation of a starter motor (not shown).

In a ROM 15 of the engine ECU 16, an engine control program is stored which includes at least an engine control algorithm 15a, an I/O (Input/Output) control algorithm 15b and an anti-theft algorithm 15c. The engine ECU 16 operates according to the engine control program, and discriminates or verifies the reception of an enable code by the anti-theft algorithm 15c. If the enable signal is correct data, the engine ECU 16 performs a specific control based on the engine control algorithm 15a for the respective terminal devices such as a fuel injection valve 17, a fuel pump 18 and an ignition control unit 20 connected to the signal port selected by the I/O control algorithm 15b, thereby to enable the start and running of the vehicle.

If the reference ID code stored in the EEPROM 13A and the key ID code transmitted from the key 2 and read in do not match each other or they are not in a predetermined relationship, the compare function unit 13S does not issue an enable signal. Accordingly, the start of the vehicle by the ECU 16 is inhibited, and a horn 14 is activated by the immobilizer CPU 13 to provide an appropriate alarm and display.

When the enable signal transmitted from the compare unit 13S is not correct data, the start of the vehicle by the engine ECU 16 is also inhibited. Thus, the illegal start-up of the engine and the driving of the vehicle by a wrong key are prevented to ensure the vehicle anti-theft function.

Although the immobilizer unit 10 and the engine ECU 16 are separate from each other in the system of FIG. 8, the function of the immobilizer unit 10 and that of the engine ECU 16 may be integrated into one unit as an Integral-type ECU 30a with an anti-theft function, as shown in FIG. 9, whereby the number of parts is reduced to increase the productivity and reliability. Since, in such integral structure, it is not necessary to encode the signal transferred from the immobilizer CPU 13 to the engine ECU 16, a simple binary signal can be utilized as an enable signal.

The function of the above described transponder type immobilizer for preventing illegal engine start-up and vehicle driving is very effective for vehicles to be used in areas or countries where thefts occur frequently, but, if such a function is provided even on vehicles to be used in areas where thefts occur infrequently, users are undesirably forced to share the cost burden of the unnecessary equipment. Accordingly, it is preferable that vehicles which are or are not equipped with the anti-theft function are manufactured in parallel depending on their destination.

FIG. 10 shows the construction of the main portions of an ECU 30b without the anti-theft function, which is to be mounted on vehicle which is not to be equipped with the anti-theft function, instead of the ECU 30a with the anti-theft function.

As apparent from the comparison of FIG. 10 with FIGS. 8 and 9, the transmitter 4 of the key 2 and the induction coil 6 of the key cylinder 5 have been removed, and in the ECU 30b, the anti-theft unit elements such as the I/F circuits 11 and 12 and the immobilizer CPU 13 which are included in the immobilizer unit 10 of FIG. 8 have been removed. As for the ROM for storing the engine control program executed by the engine ECU 16, the above ROM 15 in FIG. 8 including the anti-theft algorithm 15c for performing the verification of the enable code, or the like has been replaced with ROM 15' which does not include anti-theft algorithm 15c.

Generally, the ECUs 30a and 30b are connected to the terminal devices such as the antenna unit 29, the fuel injection valve 17, and the like by the connectors 40 and 50 which are relatively easily inserted and removed. Accordingly, there was a problem that, once an ill-intentioned third party illegally gets an ECU 30b having no anti-theft function and replaces an ECU 30a with the ECU 30b, the starting and driving of the vehicle would be possible without the discrimination of ID code outputted from the antenna unit 29, and thus the theft of the vehicle would be accomplished.

In addition, the ROM 15 (15') is also connected to the CPU within the engine ECU 16 by an IC socket which is inserted or removed with relative ease. Accordingly, there was a similar problem that, once an ill-intentioned third party illegally replaces a ROM 15 which includes the anti-theft algorithm with a ROM 15' which does not include the anti-theft algorithm 15c, then the starting and driving of the vehicle would be possible without the discrimination of the enable code outputted from the immobilizer CPU 13 in the engine ECU 16, and thus the theft of the vehicle would be accomplished.

SUMMARY OF THE INVENTION

It is an object of the present invention to solve the above problem of the prior art and provide a vehicle anti-theft system wherein an electronic circuit unit (ECU 30a or ROM 15) having the anti-theft function is prevented from being illegally replaced with an electronic circuit unit without the anti-theft function, or the start-up of the engine can be prevented even if the electronic circuit is illegally replaced.

The vehicle anti-theft system of the present invention comprises an engine control means for comparing the inputted ID code with a reference ID code prestored in the vehicle and enabling the start-up of the engine if the two ID codes are in a predetermined relationship, various drive and control means (terminal devices) which are controlled by the engine control means, and a pair of connector means provided in the respective signal lines of the engine control means and the terminal devices, and engaged each other for electrically connecting those respective means, and is characterized by further providing the following features:

(1) Forming the engagement portion of the pair of connector means into a unique shape according to the construction or function of the engine control means.

(2) Putting the connection between each electrical contact and each signal line in the pair of connector means in a unique relationship according to the construction of the engine control means.

In accordance with the above feature (1), since electrical connection between the engine control means and the terminal devices is made through connector means having a unique shape according to the construction or function of the engine control means, the connector of the engine control means having a different construction and the connector of the terminal devices cannot be engaged each other, and thus these two cannot be electrically connected.

In accordance with the above feature (2), since the electrical connection between the engine control means and the terminal devices is made through the connector means in which the connection between each electrical contact and each signal line is in a unique relationship, the connector of the engine control means having a different construction and the connector of the terminal devices cannot be put in a normal electrical connection even if the two are engaged each other.

The vehicle anti-theft system of the present invention is characterized by comprising a memory means in which an engine control program including at least an engine control algorithm and I/O control algorithm is stored, an engine control means which operates according to the engine control program to execute a unique control based on the engine control algorithm for respective terminal devices on the signal ports selected by the I/O control algorithm, and a connection means constructed to electrically connecting the respective signal ports of the engine control means and the respective terminal devices with a predetermined correspondence relationship, wherein the I/O control algorithm selects either of first and second signal ports as a signal port for at least one of the terminal devices depending on whether or not the engine control program further includes an anti-theft control algorithm, and the connection means is constructed so that the selected signal port is connected to the terminal device.

In accordance with the above described construction, the connection relationship between the respective signal ports of the engine control means and the respective terminal devices differ depending on whether or not the engine control program includes the anti-theft control algorithm, and the I/O control algorithm of the engine control program also has contents according to the respective connection relationships. Accordingly, even if someone illegally gets a memory means in which an engine control program having no anti-theft control algorithm is stored, and attempts to use this instead of memory means in which the engine control program including the anti-theft algorithm is stored, the connection relationships between the respective signal ports of the engine control means and the respective terminal devices become abnormal and the normal engine control cannot be performed, thereby preventing the theft of the vehicle.

BRIEF DESCRIPTION OF THE DRAWING

FIG. 1 is a perspective view showing a first embodiment of the fitting portion of the connector of the present invention.

FIG. 10 is a block diagram showing a prior art ECU without anti-theft function.

DETAILED DESCRIPTION OF THE PREFERRED EMBODIMENT

Figure 2A:
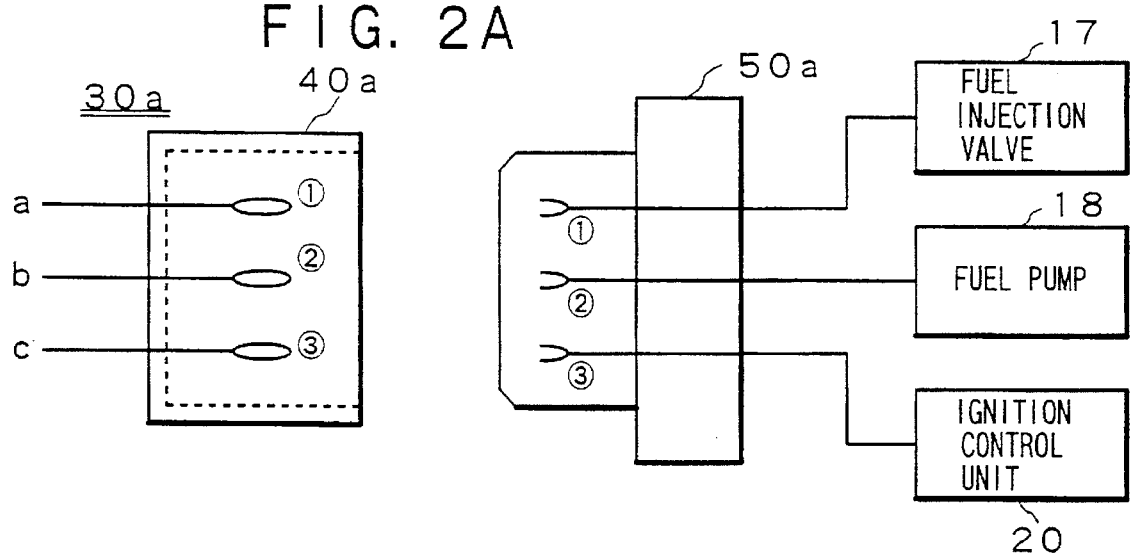
FIGS. 2A to 2C are schematic illustrations showing a second embodiment of the fitting portion of the connector of the present invention.

Now, embodiments of the present invention are described in detail with respect to the drawings. FIG. 1 is a perspective view showing a fitting portion of a connector on an ECU side and a connector on a terminal device side such as the fuel injection valve 17 and others, in the first embodiment of the present invention. A part (a) of the figure shows an example of connectors for a vehicle with the ECU 30a including the immobilizer CPU and others, while a part (b) shows an example of connectors for a vehicle with the ECU 30b which does not include the immobilizer CPU and others.

In this embodiment, the shape of each fitting portions of the connectors 40a, 40b on the ECU 30a and 30b sides and the connector 50a, 50b on the terminal devices side is respectively made into a unique or different shape, depending on whether or not the particular ECU includes the immobilizer CPU and others.

In the (a) part of the figure, the positions of grooves 8a, 8b, 8c and 8d provided in the connector 40a on the ECU 30a side are coincident with those of ribs 9a, 9b, 9c and 9d provided in the connector 50a on the terminal devices side. Similarly, also in the (b) part, grooves 8'a, 8'b, 8'c and 8'd provided in the connector 40b are coincident in position with ribs 9'a, 9'b, 9'c and 9'd provided in the connector 50b. Accordingly, the respective connectors 40a and 50a, and 40b and 50b can be completely engaged with each other, whereby normal electrical connections between the ECU 30a (30b) and the respective terminal devices 50a (50b) can be performed.

On the other hand, even if the connector 40b of the ECU 30b which does not include the immobilizer CPU 13 and others is attempted to be engaged with the connector 50a which should originally be connected to the ECU 30a including the immobilizer CPU 13 and others, it cannot be engaged because the ribs and grooves of these two parts are not in coincidence. Accordingly, if an ill-intentioned third party illegally tries to use the ECU 30b which does not include the immobilizer CPU 13 instead of the ECU 30a which includes the immobilizer CPU 13 and others, electrical connection of the two cannot be attained, and thus the theft of the vehicle by replacing the ECU 30a with the ECU 30b is prevented.

In addition, in the above embodiment, although the illegal connector engagement is prevented by making the respective positional relationships between the grooves and ribs different, the present invention is not limited to this, and the illegal connector engagement may be prevented by whether or not the grooves or ribs exist, or by making the shape and/or size of the connectors different each other.

Figure 2B:
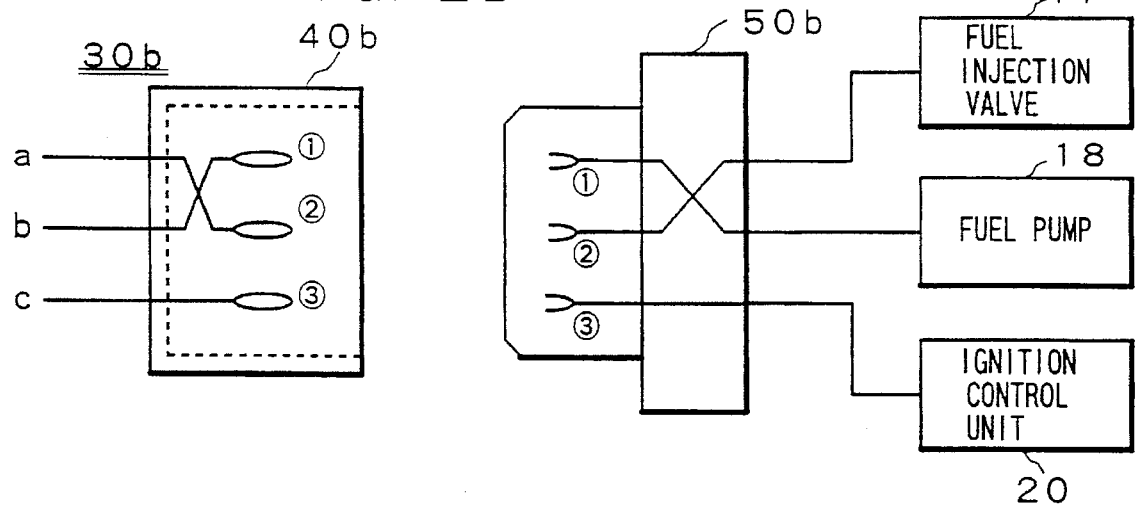
Figure 2C:
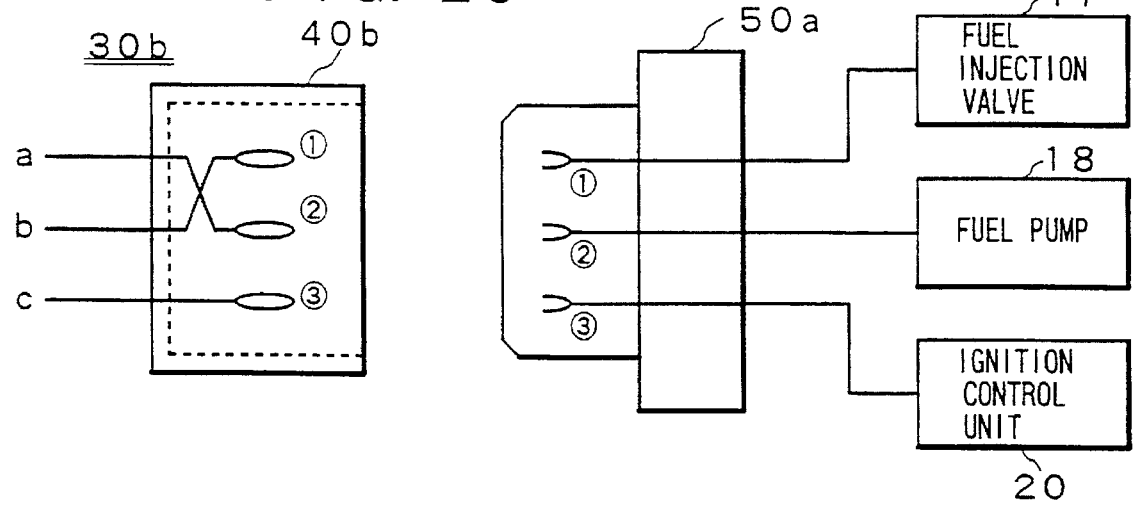

FIGS. 2A, 2B and 2C are schematic diagrams showing pin connections of the respective signal lines a, b and c within the connector 40a, 40b on the ECU side and the connector 50a, 50b on the fuel injection valve 17 side in the second embodiment of the present invention. FIG. 2A shows an example of the ECU 30a which includes the immobilizer CPU 13, while FIG. 2B shows an example of the ECU 30b which does not include the immobilizer CPU 13.

In this embodiment, the connection relationships between the respective electrical contacts (connection pins and receptacles) and the respective signal lines in the connector 40a, 40b on the ECU side and the connector 50a, 50b on the fuel injection valve 17 side are made to be respectively unique or different, depending on whether or not the particular ECU includes the immobilizer CPU 13.

In FIG. 2A, signal lines a, b and c are connected to the pins ①, ② and ③ of the connector 40a on the ECU 30a side, respectively, while the fuel injection valve 17, the fuel pump 18 and the ignition control unit 20 are connected to the pins ①, ② and ③ of the connector 50a, respectively. As a result, the signal lines a, b and c are connected to the fuel injection valve 17, the fuel pump 18 and the ignition control unit 20, respectively, thereby to provide a normal electrical connection.

In FIG. 2B, the pins connected to the signal lines a and b of the connector 40b on the ECU 30b side are interchanged with each other, as compared with FIG. 2A, and, the pins connected to the fuel injection valve 17 and the fuel pump 18 are also interchanged with each other in the connector 50b, which results in a normal electrical connection.

If an ill-intentioned third party illegally attempts to mount an ECU 30b which does not include the immobilizer CPU 13, instead of the ECU 30a including the immobilizer CPU 13 and fits the connector 40b on the ECU 30b side over the connector 50a as shown in FIG. 2C, then the signal lines a and b are respectively connected to the fuel pump 18 and the fuel injection valve 17. Accordingly, a normal electrical connection cannot be achieved, so that the vehicle is prevented from being stolen by the replacement of the ECU. In addition, such wrong connection may be detected by an appropriate detection means to give an audible alert or the like.

Although, in the above described embodiments, the position and shape of the fitting portion of the connector, or the connection relationships between the respective electrical contacts and signal lines in the connector are made unique according to the construction of the ECU (with or without anti-theft function), the position and shape of the fitting portion and the connection relationships may both be unique.

In accordance with above mentioned embodiments of the present invention, the electrical connection between an engine control means which compares the key ID code with a reference ID code and enables the start-up of the engine only when the two ID codes are in a predetermined relationship, and terminal devices which are controlled by the engine control means, is made through a connector means which has a unique shape and/or dimension according to the function and construction of the engine control means, or through a connector means in which the signal lines have a unique connection relationship according to the function of the engine control means, so that the vehicle is prevented from being stolen by replacing the original engine control means with wrong engine control means of a different construction.

Figure 3A:
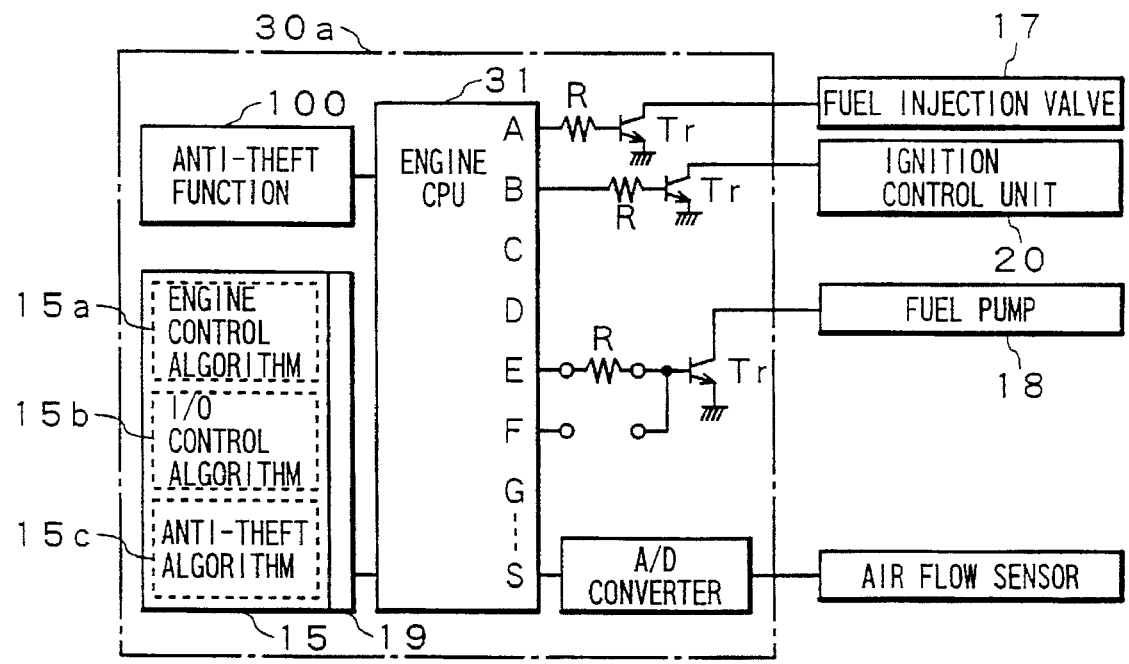
FIGS. 3A and 3B are block diagrams for explaining a third embodiment of the present invention.
Figure 3B:
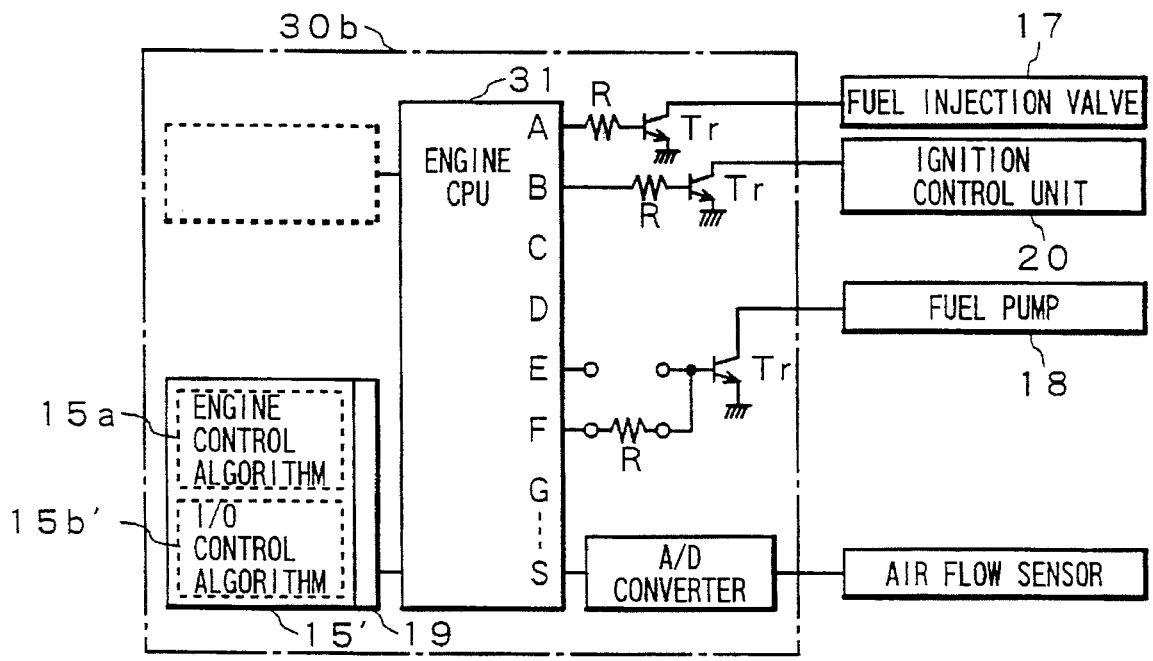

The third embodiment of the present invention will be described in detail with reference to the drawings. FIG. 3A shows an engine ECU 30a which includes an anti-theft function 100 (the function of the immobilizer unit 10), and FIG. 3B shows another engine ECU 30b which does not include the anti-theft function 100. One of the ECU's is selectively mounted on a vehicle. The same symbols as FIGS. 7 to 10 represent the same or identical portions.

Figure 7:
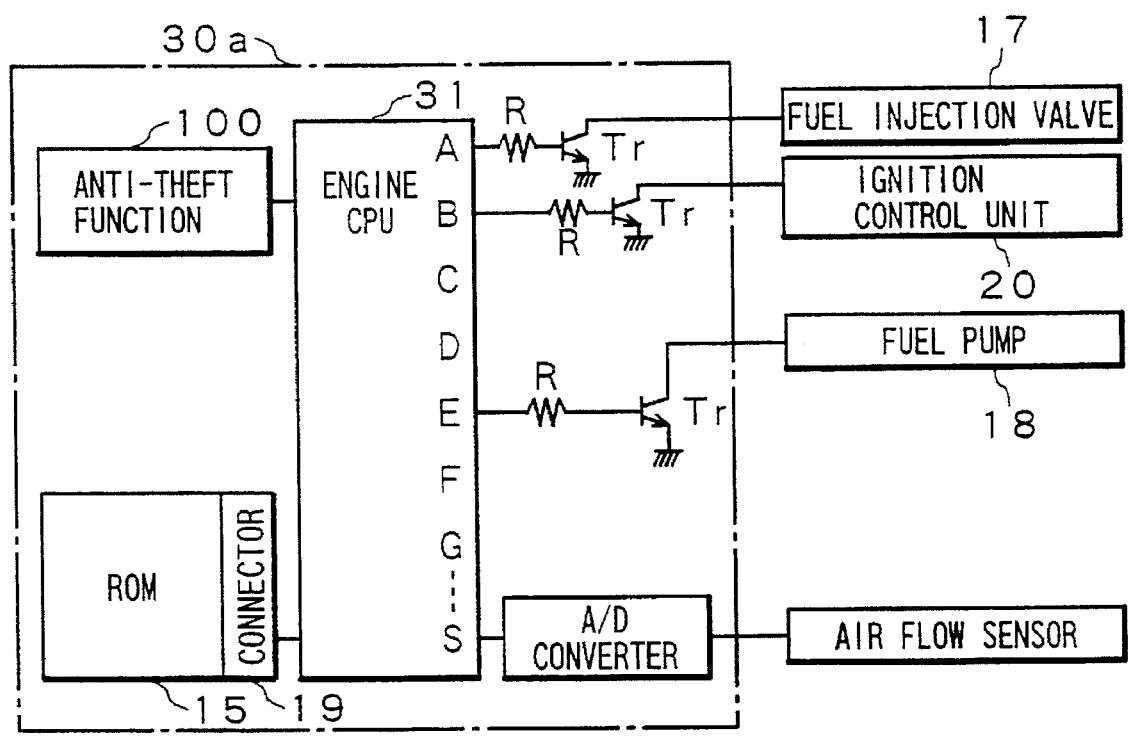
FIG. 7 is a block diagram showing main portions of a conventional vehicle anti-theft system.
Figure 8:
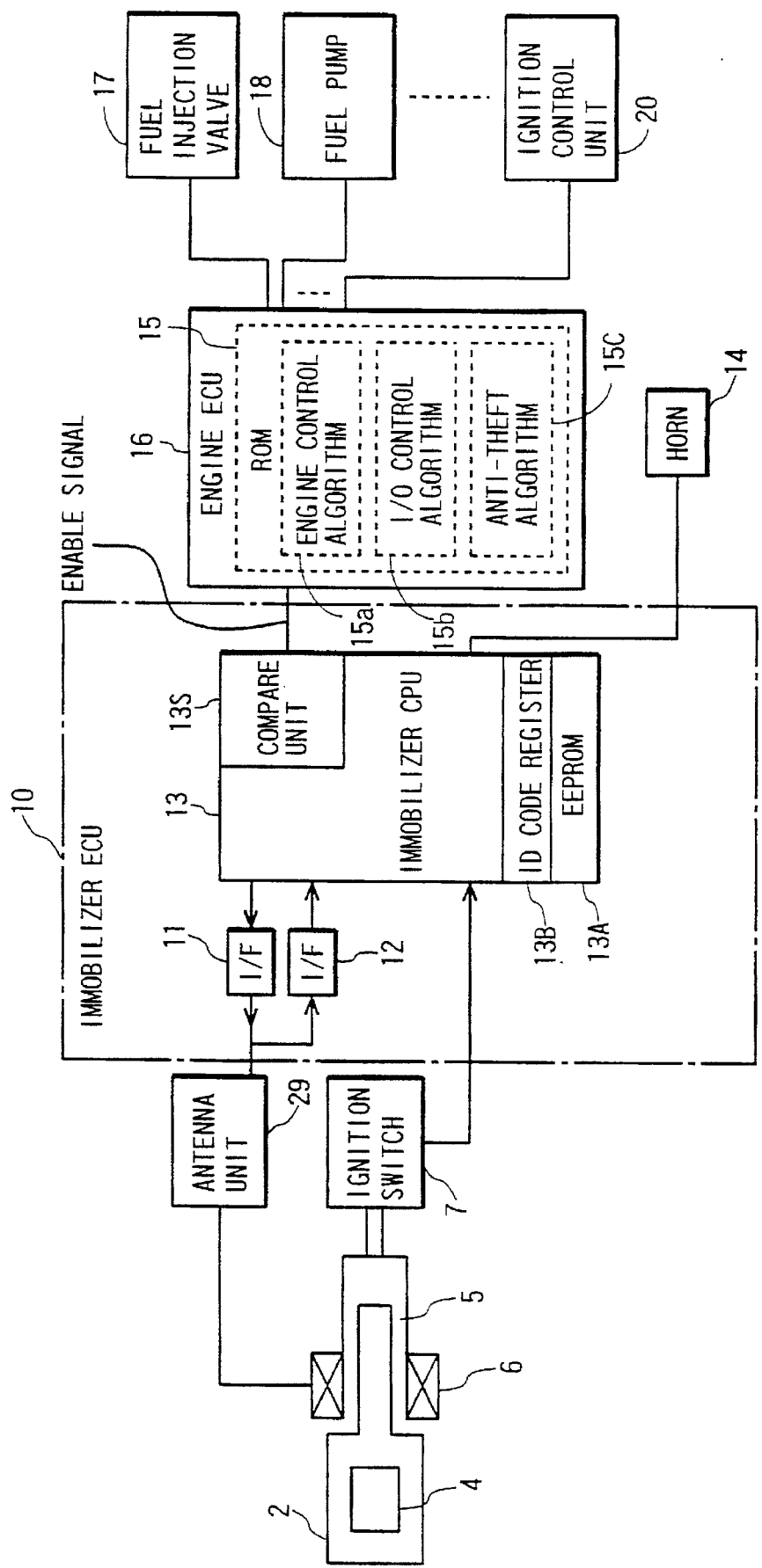
FIGS. 8 and 9 are block diagrams each showing a conventional immobilizer unit with anti-theft function.
Figure 9:
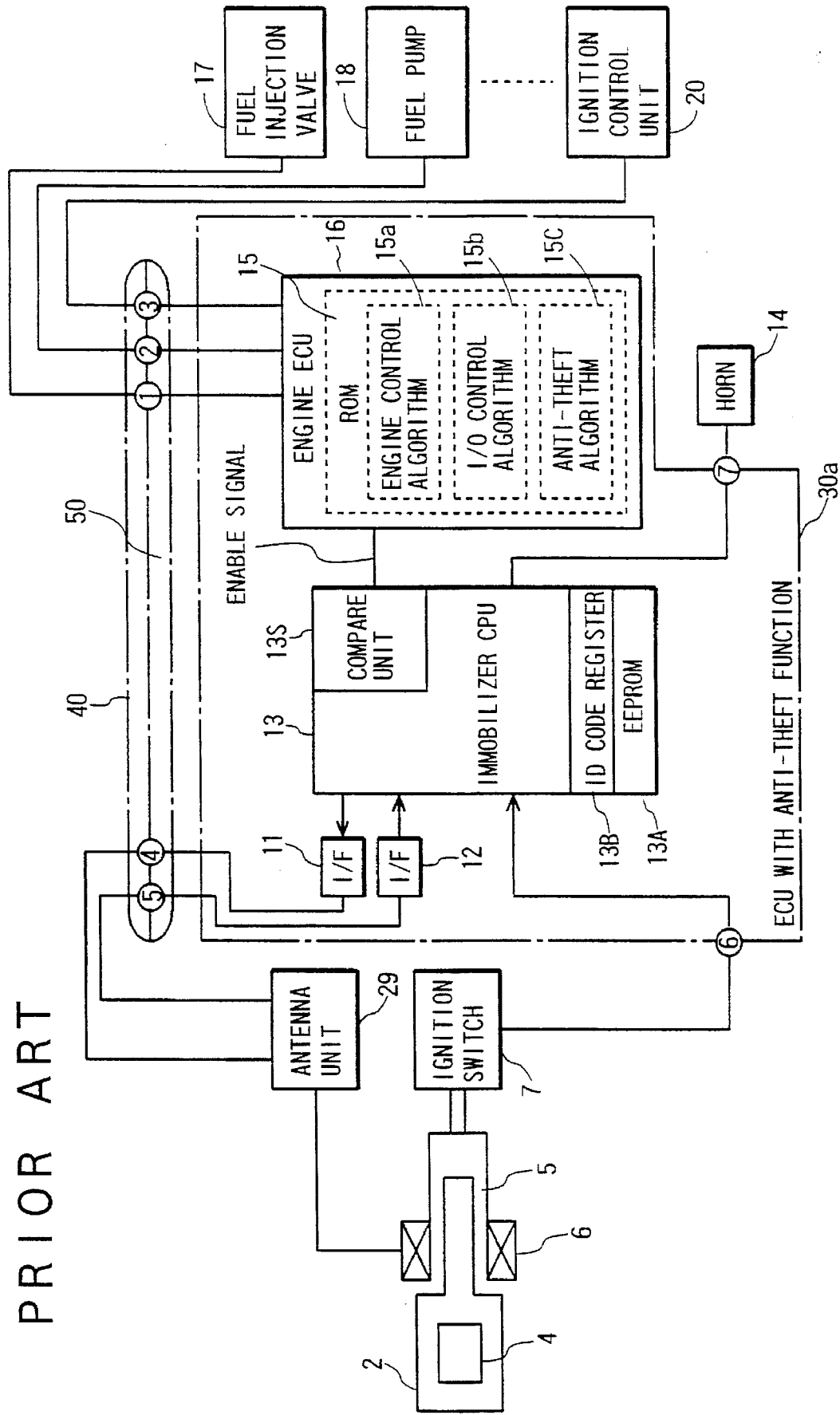

In the prior art described with reference to the FIGS. 8 and 9, the output signal to the fuel pump 18 is always outputted, for instance, from a specific output port of the engine CPU 31 as detailed in FIG. 7 (in the figure, from the output port E) regardless of whether or not the anti-theft function is provided.

However, in this embodiment, if the anti-theft function 100 is to be provided, the output port E is connected to the fuel pump 18 through a resistor R and a transistor Tr as shown in FIG. 3A, and into a connector 19 a ROM 15 is inserted in which an engine control program including an I/O control algorithm 15b for causing a fuel pump control signal to be outputted from the output port E is stored.

On the other hand, if the anti-theft function 100 is not to be provided, an output port F other than the port E is connected to the fuel pump 18 through a resistor R and a transistor Tr, as shown in FIG. 3B, and into a connector 19 a ROM 15' is inserted in which an engine control program including an I/O control algorithm 15b' for causing a fuel pump control signal to be outputted from the output F is stored.

Thus, even if an ill-intentioned third party illegally attempts to replace the ROM 15 including the anti-theft control algorithm with a wrong ROM 15' which does not include the anti-theft algorithm 15c, for preventing the determination of matching of the enable code from being performed, the fuel pump control signal is not supplied to the fuel pump 18 connected to the output port E, because the fuel pump control signal is outputted at the output port F rather than E. Accordingly, the fuel pump 18 does not normally operate, thereby to prevent the start-up of the engine.

As described above, in accordance with this embodiment, the pattern of the connection between the CPU 31 within the ECU 30a (30b) and each terminal device is made different depending on whether the ROM inserted in the connector 19 includes the anti-theft algorithm 15c (ROM 15) or does not include that algorithm (ROM 15'), and in the ROM 15 and ROM 15', the algorithms 15b and 15b' are employed in which algorithms the signal ports to or from which sensor signals or control signals are inputted or outputted are different from each other. Accordingly, even if an ill-intentioned third party illegally attempts to replace the ROM 15 including the anti-theft algorithm 15c with the ROM 15' which does not include the anti-theft algorithm 15c, the engine does not start up, so that the theft of the vehicle is not accomplished.

Figure 4A:
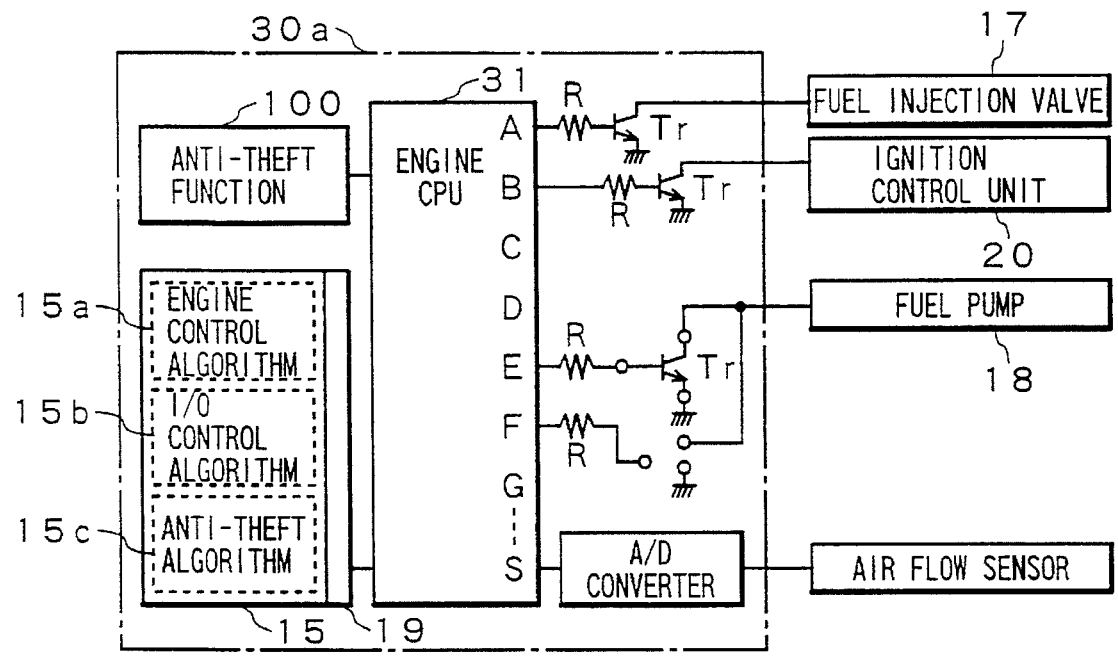
FIGS. 4A and 4B are block diagrams for explaining a fourth embodiment of the present invention.
Figure 4B:
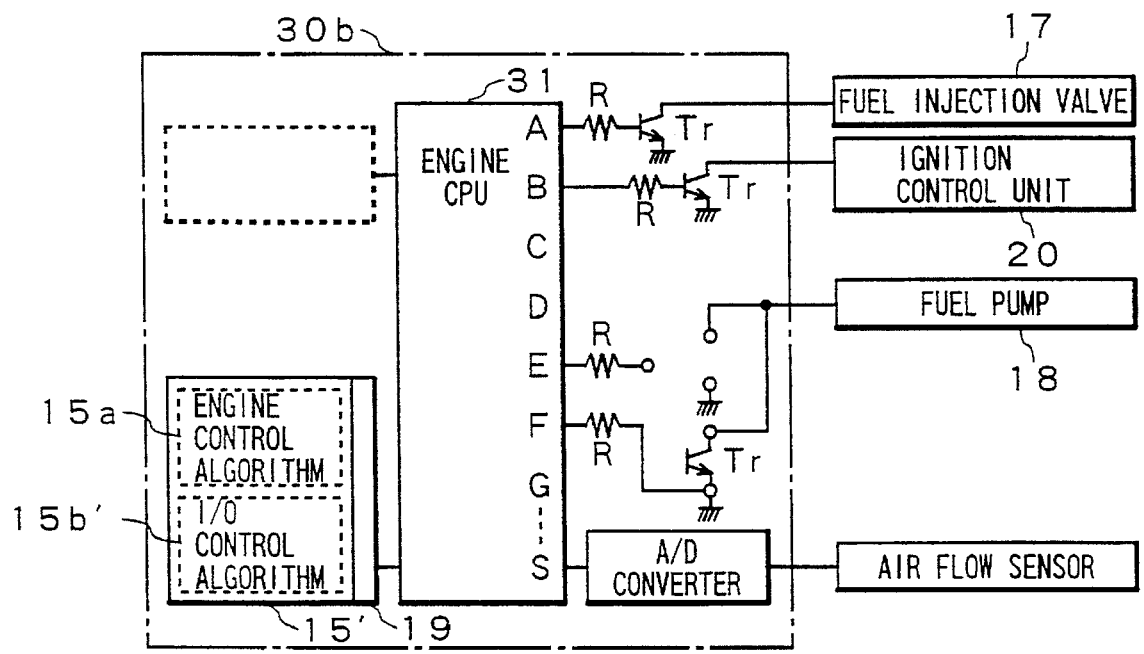

FIGS. 4A and 4B are diagrams showing the fourth embodiment of the present invention. FIG. 4A shows an ECU 30a which includes anti-theft function 100, and FIG. 4B shows another ECU 30b which does not include the anti-theft function 100.

In the third embodiment, the selection of the terminal devices to be connected to the respective signal ports of the engine CPU 31 is performed by changing the connection of the resistor R, while in the fourth embodiment, it is performed by changing the connection of the transistor Tr. It is obvious that the same effect can also be achieved by the fourth embodiment.

Although, in the above respective embodiments, the selection of the terminal devices to be connected to the respective signal ports of the engine CPU 31 is performed by changing the connection of the resistor or transistor which connects the two, the present invention is not limited to these, but it may be constructed as following:

(1) Only the arrangement of the control means and sensor which are connected to the ports is simply changed.

(2) By interchanging two resistance elements whose resistance values are largely different (for instance, 100M and 10K), or two transistors whose current amplification factors hFE are largely different, only the signal port selected by the I/O control algorithm 15b is effectively connected to a predetermined terminal device.

Figure 5A:
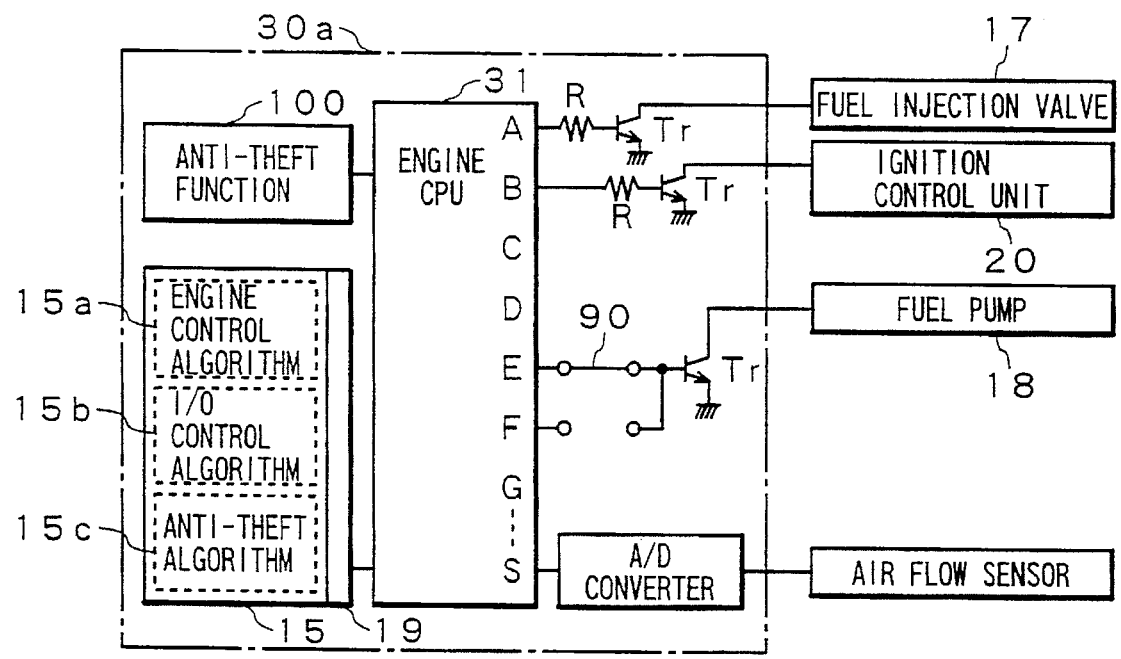
FIGS. 5A and 5B are block diagrams for explaining a fifth embodiment of the present invention.
Figure 5B:
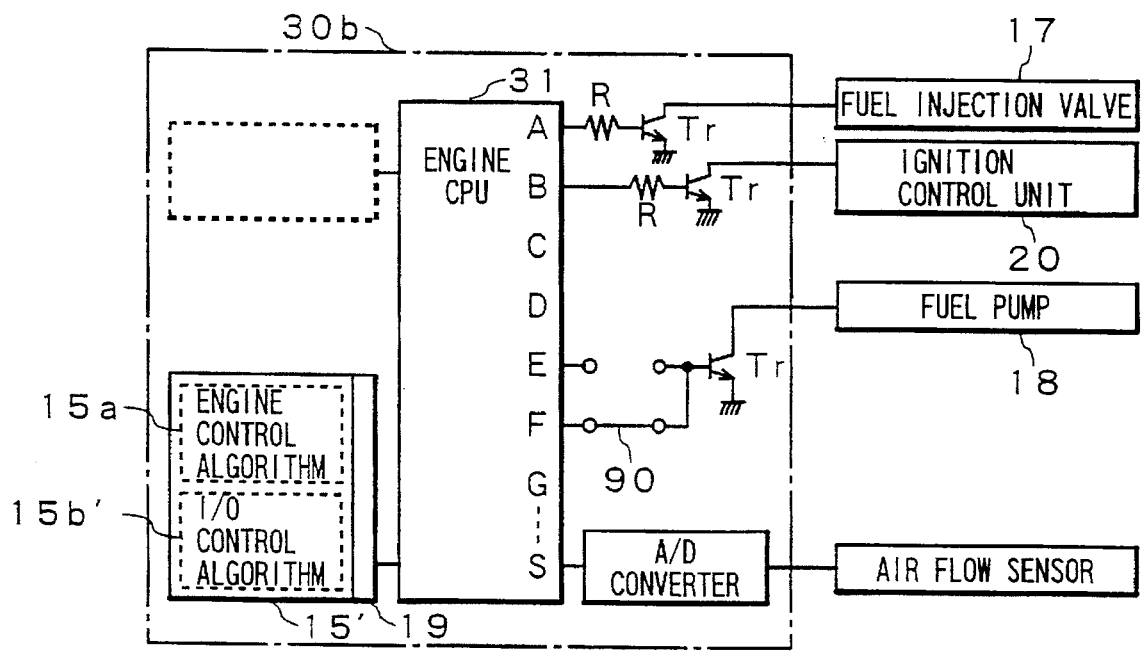
Figure 6A:
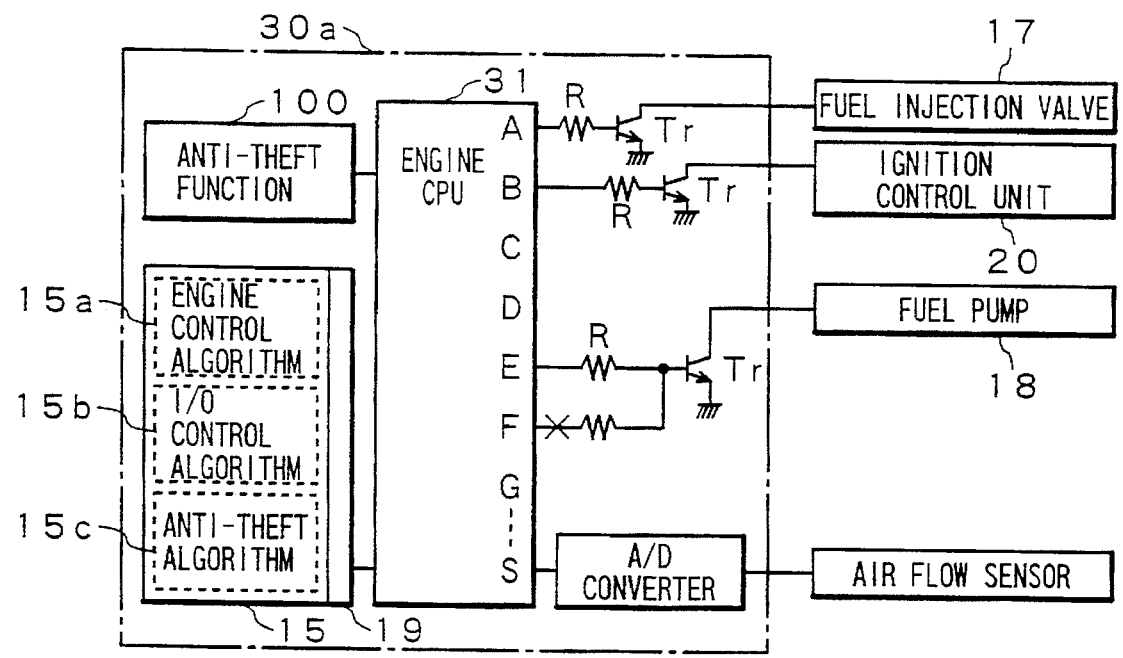
FIGS. 6A and 6B are block diagrams for explaining a sixth embodiment of the present invention.
Figure 6B:
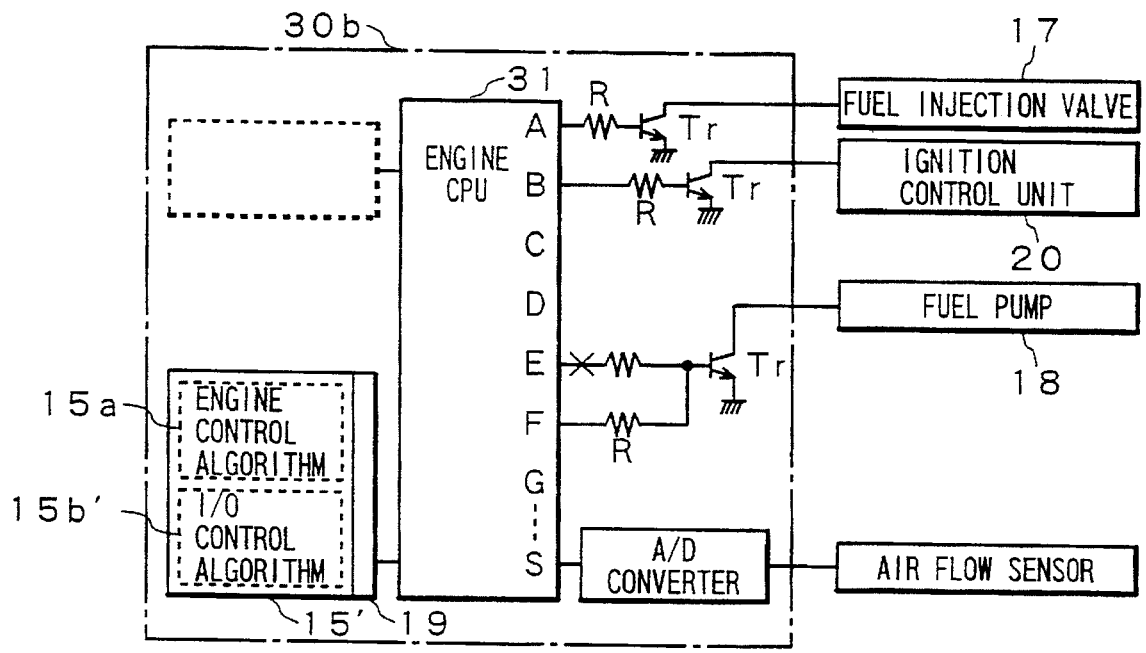

(3) By using a conventional jumper wire 90 instead of a resistor or transistor to connect a terminal device to an I/O port, as shown in FIGS. 5A (ECU with anti-theft function) and 5B (ECU without anti-theft function), or by previously connecting two ports and a single terminal device with a pair of jumper wires and/or resistors and then disconnecting one of them depending on whether or not the anti-theft function 100 is to be provided, as shown in FIGS. 6A (ECU with anti-theft function) and 6B (ECU without anti-theft function), the same anti-theft function will be realized.

As described above, in accordance with the present invention, even if an ill-intentioned third party illegally replaces the ROM 15 which includes the anti-theft control algorithm with the ROM 15' which does not include the anti-theft control algorithm, the engine does not start-up, thereby preventing the vehicle from being stolen.

What is claimed is:

1. In a vehicle control system comprising either a first type of engine control device which includes an anti-theft algorithm or a second type of engine control device containing no anti-theft algorithm, said system including a terminal device which exhibits a function necessary for engine control when said terminal device is electrically connected to either of said first and second types of engine control devices;

the improvement comprising separable electrical connecting means for normally connecting said first type of engine control device to said terminal device, said connecting means being so arranged that it cannot normally connect said second type of engine control device to said terminal device.

2. The vehicle control system of claim 1 wherein said connecting means comprise first and second complementary connectors, said first connector being coupled to a said first type of engine control device for use on a vehicle having an anti-theft function and said second connector being coupled to a said terminal device on said vehicle, and third and fourth complementary connectors, said third connector being coupled to a said second type of engine control device for use on a vehicle that does not have an anti-theft function and said fourth connector being coupled to a said terminal device on a vehicle that does not have an anti-theft function, said connectors being so configured that said first and fourth connectors cannot be fitted together and said second and third connectors cannot be fitted together.

3. The vehicle control system of claim 1 wherein said connecting means comprise first and second connectors which respectively have signal terminals that mate with one another when said first and second connectors are fitted together, said first connector being coupled to a said first type of engine control device for use on a vehicle having an anti-theft function and said second connector being coupled to a said terminal device on said vehicle, and third and fourth connectors which respectively have signal terminals that mate with one another when said third and fourth connectors are fitted together, said third connector being coupled to a said second type of engine control device for use on a vehicle that does not have an anti-theft function and said fourth connector being coupled to a said terminal device on a vehicle that does not have an anti-theft function, said signal terminals being so disposed in said connectors that the signal terminals in said first and fourth connectors do not mate with one another if said first and fourth connectors are fitted together, and said signal terminals in said second and third connectors do not mate with one another if said second and third connectors are fitted together.

4. The vehicle control system of claim 1 wherein said first type of engine control device includes a first input/output control means which is different from a second input/output control means included in said second type of engine control device, said first input/output means being operative to select a first input/output terminal different from a second input/output terminal selected by said second input/output control means, as the input/output terminal of the engine control device to which the terminal device is connected, said connecting means being arranged to connect said first input/output terminal to said terminal device.

5. The vehicle control system of claim 4 wherein said connecting means connects said first input/output terminal to the terminal device through a resistor element.

6. The vehicle control system of claim 4 wherein said connecting means connects said first input/output terminal to the terminal device through a transistor element.

7. The vehicle control system of claim 4 wherein said connecting means connects said first input/output terminal to the terminal device through a jumper wire.

8. The vehicle control system of claim 4 wherein said connecting means connects said first and second input/output terminals to said terminal device through a pair of resistor elements respectively, the one of said resistor elements connected between the second input/output terminal and the terminal device being disabled.

9. The vehicle control system of claim 4 wherein said connecting means connects said first and second input/output terminals to said terminal device through a pair of transistor elements respectively, the one of said transistor elements connected between the second input/output terminal and the terminal device being disabled.

10. The vehicle control system of claim 4 wherein said connecting means connects said first and second input/output terminals to said terminal device through a pair of jumper wires respectively, the one of said jumper wires connected between the second input/output terminal and the terminal device being disabled.

* * * * *